(12) United States Patent
Kamiya et al.

(10) Patent No.: US 6,584,427 B2
(45) Date of Patent: Jun. 24, 2003

(54) METHOD AND APPARATUS FOR ESTIMATING TIRE AIR PRESSURE

(75) Inventors: Kazuhiro Kamiya, Aichi-ken (JP); Yukio Mori, Aichi-ken (JP); Takaji Umeno, Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/993,631

(22) Filed: Nov. 27, 2001

(65) Prior Publication Data

US 2002/0065617 A1 May 30, 2002

(30) Foreign Application Priority Data

Nov. 27, 2000 (JP) .......................... 2000-359567

(51) Int. Cl.⁷ ............................................. B60C 23/00
(52) U.S. Cl. ....................... 702/140; 702/138; 73/146.2
(58) Field of Search .......................... 702/41, 47, 138, 702/140, 142; 73/146, 146.2, 146.5; 340/442, 443, 444, 445

(56) References Cited

U.S. PATENT DOCUMENTS

| | | | | |
|---|---|---|---|---|
| 5,670,716 A | * | 9/1997 | Tamasho et al. ............ 73/146.2 |
| 5,982,279 A | * | 11/1999 | Tominaga et al. ........... 340/444 |
| 6,092,028 A | * | 7/2000 | Naito et al. .................... 702/47 |
| 6,385,553 B1 | * | 5/2002 | Naito et al. .................. 702/138 |

* cited by examiner

Primary Examiner—Bryan Bui
(74) Attorney, Agent, or Firm—Burns, Doane, Swecker & Mathis, LLP

(57) ABSTRACT

The present invention provides a method and apparatus for estimating a state of tire air pressure with high accuracy in a range of vehicle speeds from a low travel speed to a high travel speed. A wheel speed of each of a right-hand front wheel and a right-hand rear wheel is detected based on wheel speed signals outputted from vehicle speed sensors, and characteristic amounts (power) of frequency characteristics of the wheel speeds are calculated. A value of difference which represents a degree of difference between the obtained characteristic amounts of the right-hand front wheel and the right-hand rear wheel is calculated. Based on the value of difference, the state of air pressure of a tire is determined. As a result, it can be determined if the air pressure of one of tires on the right-hand front wheel and the right-hand rear wheel has been reduced.

20 Claims, 7 Drawing Sheets

METHOD AND APPARATUS FOR ESTIMATING TIRE AIR PRESSURE

BACKGROUND OF THE INVENTION

1. Filed of the Invention

The present invention relates to an apparatus for estimating tire air pressure, and specifically to a method and apparatus for estimating the state of air pressure of a tire or each of tires based on wheel speed.

2. Description of the Related Art

As an apparatus for estimating the state of air pressure of a tire, a technique has conventionally been known wherein a wheel speed signal including a vibration frequency component of a tire at the time of running of a vehicle is subjected to frequency analysis and a resonance frequency of the tire is extracted therefrom, and, based on the resonance frequency, the state of air pressure of the tire is detected (see Japanese Patent Registration No. 2,836,652 and the like).

A resonance frequency to be set in the technique for estimating air pressure based on the resonance frequency of a tire is generally in the range from about 30 to 50 Hz. However, this technique has a problem that there are cases in which the air pressure of a tire cannot be accurately estimated depending on the state in which a vehicle is placed.

For example, when the speed of a vehicle is set in a range from a low speed to a medium speed when the vehicle is running in an urban area, the air pressure of a tire can be estimated with high accuracy at approximately 30 to 50 Hz in the above-described range of resonance frequencies. However, when the speed of a vehicle is set in a range of high speed, a tire vibration phenomenon tends not to occur, and a power spectral level of resonance frequency is lowered. As a result, estimation accuracy of the air pressure of the tire is reduced.

On the other hand, Japanese Patent Application Laid-Open (JP-A) No. 9-2031 discloses a technique in which, when the speed of a vehicle is low, the air pressure of a tire is estimated based on a spring constant of the tire, which is an index having a high correlation with the above-described resonance frequency, and, when the speed of the vehicle is high, the air pressure of the tire is estimated based on dynamic load radius of the tire, thereby allowing highly accurate estimation of the air pressure of the tire irrespective of the speed of the vehicle.

However, in the technique in which the state of air pressure of a tire is estimated based on the dynamic load radius of a tire as disclosed in the above JP-A No. 9-2031, there exists a drawback in that, when a vehicle is running at a high speed, slipping of driving wheels may occur or the diameter of the tire may increase by centrifugal force, that is, so-called "tread lift" may occur, with the result that highly accurate estimation cannot be made.

SUMMARY OF THE INVENTION

The present invention has been achieved so as to solve the above-described problems, and an object of the present invention is to provide an apparatus for estimation of tire air pressure in which the state of air pressure of a tire can be estimated with high accuracy in a range of vehicle speeds from a low travel speed to a high travel speed.

In order to achieve the above-described object, an apparatus for estimating tire air pressure according to a first aspect of the present invention includes: a wheel speed detection component for detecting wheel speed of each of a front wheel and a rear wheel; a characteristic amount calculation component for calculating a characteristic amount of a frequency characteristic of each of the wheel speeds detected by the wheel speed detection component; a difference-value calculation component for calculating a value of difference which represents a degree of difference between a characteristic amount of the front wheel and a characteristic amount of the rear wheel, which characteristic amounts are calculated by the characteristic amount calculation component; and a state determination component for determining a state of air pressure of a tire based on the value of difference calculated by the difference-value calculation component.

In the apparatus for estimating tire air pressure according to the first aspect of the present invention, the wheel speed of each of the front wheel and the rear wheel is detected by the wheel speed detection component, and the characteristic amount of a frequency characteristic of each of the detected wheel speeds is calculated by the characteristic amount calculation component. The characteristic amount comprises an amplitude of a predetermined frequency of the detected wheel speed or frequencies which are mostly included in a predetermined frequency range.

Further, in the first aspect of the present invention, the value of difference which represents the degree of difference between the characteristic amount of the front wheel and the characteristic amount of the rear wheel, which characteristic amounts are calculated by the above-described characteristic amount calculation component, is calculated by the difference-value calculation component. Based on the calculated value of difference, the state of air pressure of a tire is determined by the state determination component.

In other words, in the present invention, the state of air pressure of a tire is determined based on the degree of difference in the characteristic amounts of frequency characteristics between the wheel speeds of the front wheel and the rear wheel. For this reason, even if power spectral level of a resonance frequency of the tire is lowered or the above-described tread lift occurs due to an increase in the travel speed of the vehicle to a high speed, the power spectral level is lowered or the tread lift occurs substantially similarly in all of wheels mounted to the vehicle. As a result, the state of air pressure of a tire can be estimated with high accuracy.

Further, in the present invention, the state of air pressure of a tire is determined based on the difference between the respective characteristic amounts of front and rear wheels. Because the front and rear wheels are provided at the same side, that is, at a left side or right side of the vehicle to which the front wheel and the rear wheel are applied in the present invention, even when the vehicle is running on a road surface having different states between a region on which the right wheels are running, and a region on which the left wheels are running (so-called straddle running), the state of air pressure of a tire can be estimated with high accuracy.

As described above, according to the first aspect of the present invention, the wheel speed of each of the front wheel and the rear wheel is detected, the characteristic amount of the frequency characteristic of each of the detected wheel speeds is calculated, the value of difference which represents the degree of difference between the calculated characteristic amount of the front wheel and the calculated characteristic amount of the rear wheel is calculated, and further, based on the calculated value of difference, the state of air pressure of a tire is determined. Accordingly, the state of air pressure of a tire can be estimated with high accuracy in the range of vehicle speeds from a low speed of travel to a high speed of travel.

The difference-value calculation component in the first aspect of the present invention can be provided so as to calculate, as the value of difference, a difference or ratio between the characteristic amount of the front wheel and the characteristic amount of the rear wheel.

Further, the state determination component in the first aspect of the present invention can be provided so as to make a determination that air pressure of a tire has been reduced when the degree of difference between the characteristic amount of the front wheel and the characteristic amount of the rear wheel, represented by the value of difference, is a predetermined value or more.

Moreover, the state determination component in the first aspect of the present invention may be provided so as to make a determination that air pressure of a tire has been reduced when a degree of difference between the value of difference and a predetermined reference value is a predetermined value or more.

In order to achieve the above-described object, there is also provided an apparatus for estimating tire air pressure according to a second aspect of the present invention, including: a wheel speed detection component for detecting wheel speed of each of a right-hand front wheel, a right-hand rear wheel, a left-hand front wheel and a left-hand rear wheel; a characteristic amount calculation component for calculating a characteristic amount of a frequency characteristic of each of the wheel speeds detected by the wheel speed detection component; a right-hand wheels difference-value calculation component for calculating a value of difference between right-hand wheels, which represents a degree of difference between a characteristic amount of the right-hand front wheel and a characteristic amount of the right-hand rear wheel, which characteristic amounts are calculated by the characteristic amount calculation component; a left-hand wheels difference-value calculation component for calculating a value of difference between left-hand wheels, which represents a degree of difference between a characteristic amount of the left-hand front wheel and a characteristic amount of the left-hand rear wheel, the characteristic amounts being calculated by the characteristic amount calculation component; and a state determination component for determining a state of air pressure of a tire based on the value of difference between right-hand wheels and the value of difference between left-hand wheels.

In the apparatus for estimating tire air pressure according to the second aspect of the present invention, the wheel speed of each of the right-hand front wheel, the right-hand rear wheel, the left-hand front wheel and the left-hand rear wheel is detected by the wheel speed detection component, and the characteristic amount of the frequency characteristic of each of the detected wheel speeds is calculated by the characteristic amount calculation component.

Further, according to the second aspect of the present invention, the value of difference between right-hand wheels, which represents the degree of difference between the characteristic amount of the right-hand front wheel and the characteristic amount of the right-hand rear wheel, which characteristic amounts are calculated by the above-described characteristic amount calculation component, is calculated by the calculation component for a value of difference between right-hand wheels. The value of difference between left-hand wheels, which represents the degree of difference between the characteristic amount of the left-hand front wheel and the characteristic amount of the left-hand rear wheel, which characteristic amounts are calculated by the above-described characteristic amount calculation component, is calculated by the calculation component for a value of difference between left-hand wheels. Based on the obtained value of difference between right-hand wheels and value of difference between left-hand wheels, the state of air pressure of a tire can be determined by the state determination component.

In other words, in the present invention, the state of air pressure of a tire is determined based on the degree of difference in the characteristic amounts of frequency characteristics between the wheel speeds of the right-hand front wheel and the right-hand rear wheel, and the degree of difference in the characteristic amount of frequency characteristics between the wheel speeds of the left-hand front wheel and the left-hand rear wheel. For this reason, even if a power spectral level of resonance frequency of a tire is lowered or the above-described tread lift occurs due to an increase in the travel speed of the vehicle to a high speed, the power spectral level is lowered or the tread lift occurs substantially similarly in all of wheels mounted to the vehicle. As a result, the state of air pressure of a tire can be estimated with high accuracy.

Further, in the present invention, the state of air pressure of a tire is determined based on the difference between the characteristic amounts of front and rear wheels located at the same side of the vehicle. Accordingly, even in the case of straddle running of the vehicle, the state of air pressure of a tire can be estimated with high accuracy.

As described above, according to the second aspect of the present invention, the wheel speed of each of the right-hand front wheel, the right-hand rear wheel, the left-hand front wheel and the left-hand rear wheel is detected, the characteristic amount of the frequency characteristic of each of the detected wheel speeds is calculated, the value of difference between right-hand wheels, which represents the degree of difference between the characteristic amount of the right-hand front wheel and the characteristic amount of the right-hand rear wheel, is calculated, and the value of difference between left-hand wheels, which represents the degree of difference between the characteristic amount of the left-hand front wheel and the characteristic amount of the left-hand rear wheel, is calculated. Further, the state of air pressure of a tire is determined based on the obtained value of difference between right-hand wheels and value of difference between left-hand wheels. Accordingly, the state of air pressure of a tire can be estimated with high accuracy in the range of vehicle speeds from a low travel speed to a high travel speed.

The calculation component for a value of difference between right-hand wheels in the second aspect of the present invention can be provided so as to calculate, as the value of difference between right-hand wheels, a difference or ratio between the characteristic amounts of the right-hand front wheel and the right-hand rear wheel. The calculation component for a value of difference between left-hand wheels can be provided so as to calculate, as the value of difference between left-hand wheels, a difference or ratio between the characteristic amounts of the left-hand front wheel and the left-hand rear wheel.

The state determination component in the second aspect of the present invention can be provided so as to calculate, as a value of difference between right and left, a difference or ratio between the value of difference between right-hand wheels and the value of difference between left-hand wheels, and, when the degree of difference between the value of difference between right-hand wheels, and the value of difference between left-hand wheels, represented by the value of difference between right and left, is a predetermined value or more, the state determination component can be provided so as to make a determination that the air pressure of a tire has been reduced.

Further, in the state determination component according to the second aspect of the present invention, the difference or ratio between the value of difference between right-hand wheels and the value of difference between left-hand wheels is calculated as the value of difference between right and left, and, when the degree of difference between the value of difference between right and left is a predetermined value or more, it is determined that the air pressure of a tire has been reduced.

Moreover, the characteristic amount of the frequency characteristic of a wheel speed in the second aspect of the present invention can be made an amount related to power in a predetermined frequency range of the wheel speed.

In accordance with a third aspect of the present invention, there is provided a method for estimating tire air pressure, comprising the steps of: (a) detecting wheel speed of each of a front wheel and a rear wheel; (b) calculating a characteristic amount of a frequency characteristic of each of the wheel speeds detected in the step (a); (c) calculating a value of difference which represents a degree of difference between a characteristic amount of the front wheel and a characteristic amount of the rear wheel, which characteristic amounts are calculated in the step (b); and (d) determining a state of air pressure of a tire based on the value of difference calculated in the step (c).

In accordance with a fourth aspect of the present invention, there is provided a method for estimating tire air pressure, comprising the steps of: (a) detecting wheel speed of each of a right-hand front wheel, a right-hand rear wheel, a left-hand front wheel and a left-hand rear wheel; (b) calculating a characteristic amount of a frequency characteristic of each of the wheel speeds detected in the step (a); (c) calculating a value of difference between right-hand wheels, which represents a degree of difference between a characteristic amount of the right-hand front wheel and a characteristic amount of the right-hand rear wheel, which characteristic amounts are calculated in the step (b); (d) calculating a value of difference between left-hand wheels, which represents a degree of difference between the characteristic amount of the left-hand front wheel and the characteristic amount of the left-hand rear wheel, which characteristic amounts are calculated in the step (b); and (e) determining a state of air pressure of a tire based on the value of difference between right-hand wheels and the value of difference between left-hand wheels.

DESCRIPTION OF THE PREFERRED EMBODIMENTS

Referring now to the attached drawings, preferred embodiments of the present invention will be described in detail.

[First Embodiment]

Figure 1:
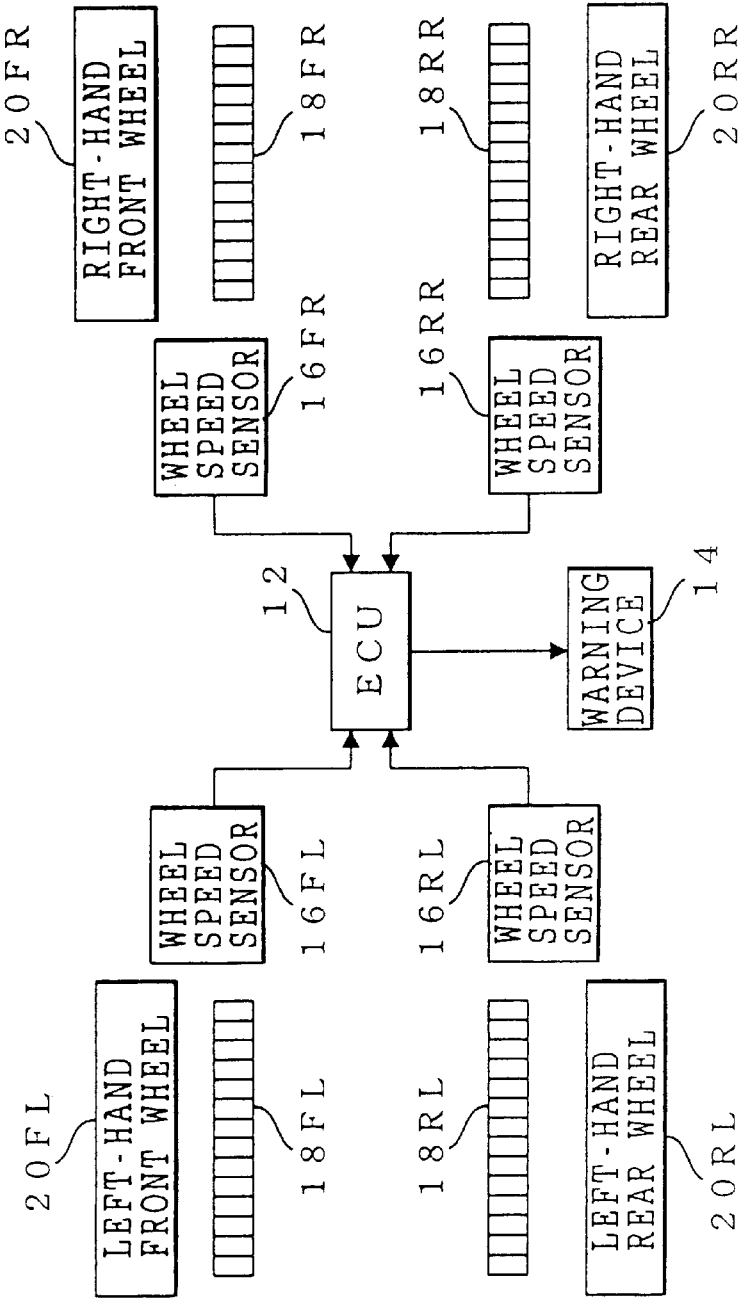
FIG. 1 is a block diagram showing the structure of an apparatus for estimation of tire air pressure according to a preferred embodiment of the present invention.

A first embodiment of the present invention shows one mode of the present invention. FIG. 1 shows the structure of an apparatus 10 for estimating tire air pressure according to the first embodiment.

As shown in FIG. 1, the apparatus 10 for estimating tire air pressure according to the first embodiment is structured so as to include an electronic control unit (hereinafter referred to as "ECU") 12 for controlling all operations of the apparatus 10 for estimating tire air pressure, a warning device 14 which gives a warning under the control of the ECU 12, and wheel speed sensors 16FL, 16FR, 16RL and 16RR provided so as to correspond to rotors 18FL, 18FR, 18RL and 18RR which are provided to a left-hand front wheel 20FL, a right-hand front wheel 20FR, a left-hand rear wheel 20RL and a right-hand rear wheel 20RR of a vehicle, respectively.

The rotors 18FL, 18FR, 18RL and 18RR are each comprised of a disk-shaped magnetic body and mounted coaxially with a rotating shaft (not shown) of a corresponding tire 20. Further, the wheel speed sensors 16FL, 16FR, 16RL and 16RR are each comprised of a pick-up coil and mounted in the vicinity of the corresponding tire 20 at a predetermined spacing. Each of the wheel speed sensors outputs an alternating current signal (hereinafter referred to as "wheel speed signal") having a cycle corresponding to the rotating speed of a corresponding rotor 18, i.e., the corresponding tire 20.

Output ends of the wheel speed sensors 16FL, 16FR, 16RL and 16RR for outputting wheel speed signals are each connected to the ECU 12 having a microcomputer including a CPU, ROM, RAM and the like. In the ECU 12, processing for estimating a state of air pressure of a tire is carried out based on the wheel speed signals inputted from the wheel speed sensors 16FL, 16FR, 16RL and 16RR. The ECU 12 controls occurrence of warnings by the warning device 14 in accordance with results of the processing.

The wheel speed sensors 16FL, 16FR, 16RL and 16RR each correspond to a wheel speed detection component of the present invention.

Figure 2:
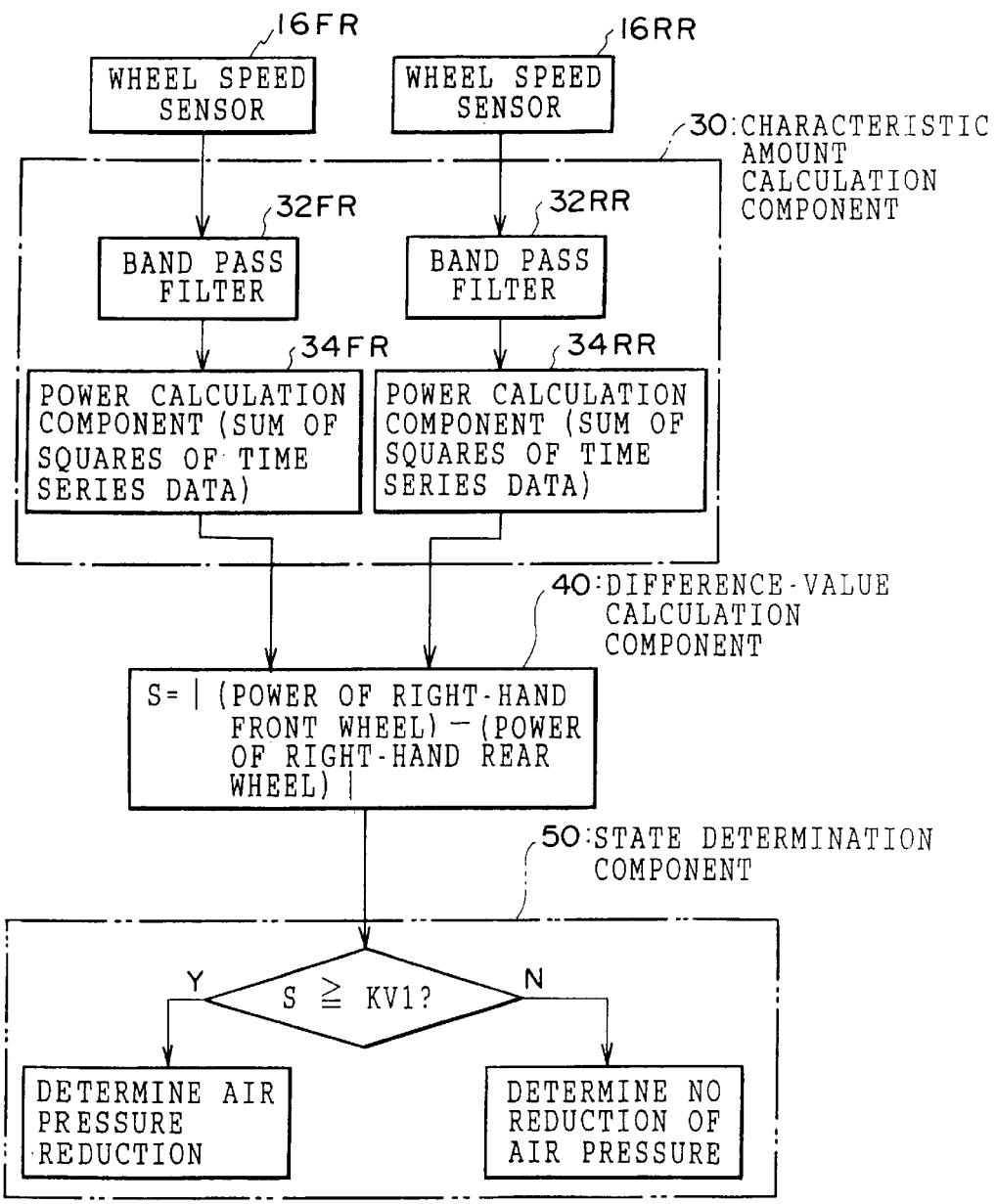
FIG. 2 is a flow diagram showing a flow of processing for estimating tire air pressure which is executed by an apparatus for estimating tire air pressure according to a first embodiment of the present invention.

Next, a description will be given of operation of the apparatus 10 for estimating tire air pressure with reference to FIG. 2. FIG. 2 is a flow diagram showing a flow of processing for estimating tire air pressure, which is iteratively executed by the ECU 12 at every predetermined interval of time (in the present embodiment, one second).

First, in a characteristic amount calculation component 30, wheel speed signals outputted from the wheel speed sensor 16FR and the wheel speed sensor 16RR are transmitted through a band pass filter 32FR and a band pass filter 32RR, respectively, which band pass filters are set so as to pass a wheel speed signal in a predetermined frequency range of wheel speed motion (in the present invention, 60 to 100 Hz). Thereafter, a sum of squares of time series data of the wheel speed signals of the right-hand front wheel 20FR and the right-hand rear wheel 20RR, after having been passed through the above-described band pass filters, is calculated by a power calculation component 34FR and a power calculation component 34RR. The results of the calculation are outputted as powers of the wheel speed signals of the right-hand front wheel 20FR and the right-hand rear wheel 20RR.

Next, in a difference-value calculation component 40, by using the power of the wheel speed signal of the right-hand front wheel 20FR and the power of the wheel speed signal of the right-hand rear wheel 20RR, which powers are outputted from the characteristic amount calculation component 30, a value of difference S is calculated by the following equation (1):

$$S=|(\text{power of right-hand front wheel})-(\text{power of right-hand rear wheel})| \quad (1)$$

In a state determination component 50, it is determined whether the value of difference S is a predetermined value KV1 or more. When the value of difference is the predetermined value KV1 or more (when this determination is affirmative), it is determined that the air pressure of a tire on one of the right-hand front wheel 20FR and the right-hand rear wheel 20RR has been reduced. In this case, a control signal for operating the warning device 14 is outputted and a warning that the air pressure of a tire is abnormal is given to a vehicle occupant. Thereafter, the processing for estimating tire air pressure ends. When the value of difference is less than the predetermined value KV1 (when the determination is negative), it is determined that the air pressure of each of tires on the right-hand front wheel 20FR and the right-hand rear wheel 20RR is normal. As a result, the processing for estimating tire air pressure ends without giving any warning.

The above-described predetermined value KV1 may be a value previously obtained by experiments or computer simulations, which value can be set such that when the value of difference S becomes the predetermined value or more, the air pressure of a tire is determined to have been reduced abnormally.

As described above in detail, in the apparatus 10 for estimating tire air pressure according to the first embodiment, the wheel speed of each of the right-hand front wheel and the right-hand rear wheel is detected, characteristic amounts (powers in a predetermined frequency range) of frequency characteristics of the detected wheel speed signals and the value of difference S which represents a degree of difference between the calculated characteristic amounts of the right-hand front wheel and the right-hand rear wheel are calculated, and further, based on the calculated value of difference S, the state of air pressure of each tire of right-hand wheels is determined. Accordingly, the state of air pressure of a tire can be estimated with high accuracy in a range of vehicle speeds from a low speed of travel to a high speed of travel.

In the apparatus 10 for estimating tire air pressure according to the first embodiment, the difference between the characteristic amount of the right-hand front wheel and the characteristic amount of the right-hand rear wheel is calculated as the value of difference according to the present invention. As a result, the above-described value of difference can be calculated simply and in a short time.

Further, in the apparatus 10 for estimating tire air pressure according to the first embodiment, it is determined by the state determination component 50 that the air pressure of a tire has been reduced when the difference between the characteristic amount of the right-hand front wheel and the characteristic amount of the right-hand rear wheel is the predetermined value KV1 or more. Accordingly, this determination can be carried out simply and in a short time.

Moreover, in the apparatus 10 for estimating tire air pressure according to the first embodiment, the amount related to the power in the predetermined frequency range of wheel speed is used as the characteristic amount of the frequency characteristic of the wheel speed. Accordingly, the above-described characteristic amount can be derived simply and in a short time.

In the first embodiment of the present invention, there has been described a case in which estimation for the state of air pressure is directed to tires on the right-hand front wheel 20FR and the right-hand rear wheel 20RR. However, the present invention is not limited to the same. For example, the estimation for the state of air pressure can also be directed to tires on the left-hand front wheel 20FL and the left-hand rear wheel 20RL. In this case, the wheel speed sensors which each output the wheel speed signal to the characteristic amount calculation component 30 shown in FIG. 2 can be simply substituted by the wheel speed sensor 16FL and the wheel speed sensor 16RL. In this case as well, the same effect as that of the first embodiment can be obtained.

Further, in the first embodiment of the present invention, there has been described a case in which an absolute value of the difference in the powers of the wheel speed signals between the right-hand front wheel 20FR and the right-hand rear wheel 20RR is used as the value of difference according to the present invention. However, the present invention is not limited to the same. For example, a power ratio S' between the vehicle speed signals of the right-hand front wheel 20FR and the right-hand rear wheel 20RR, given by the following equation (2), can also be used as the value of difference.

$$S'=\text{power of right-hand rear wheel}/\text{power of right-hand front wheel} \quad (2)$$

In this case as well, the same effects as in the first embodiment can be obtained.

Moreover, in the first embodiment of the present invention, there has been described a case in which the state of air pressure of a tire is estimated based on the determination as to whether the value of difference S is the predetermined value KV1 or more. However, the present invention is not limited to the same. For example, a mode can also be applied wherein, when a degree of difference between the value of difference S and a predetermined reference value is a predetermined value or more, it is determined that the air pressure is abnormal, and in other cases it is determined that the air pressure is normal. The above-described predetermined reference value may be a value previously obtained by experiments, computer simulations or the like, which value equals the above-described value of difference S at a time when neither of air pressures of tires on the front and rear wheels have been reduced.

[Second Embodiment]

In the above-described first embodiment, there has been described a case in which the state of air pressure of a tire is estimated based on the value of difference S which represents the power difference between respective wheel speed signals of front and rear wheels at one of the right side and the left side of a vehicle. In the second embodiment of the present invention, a description will be given of an example of a mode according to the second embodiment of the present invention, that is, an example of the mode in a case in which the above-described value of difference S is derived from each of right-handed wheels and left-handed wheels of the vehicle and the state of air pressure of a tire is estimated based on these values. An apparatus 10 for estimating tire air pressure according to the second embodiment is structured in the same manner as in the apparatus 10 for estimating tire air pressure according to the above-described first embodiment (see FIG. 1). Therefore, description of the apparatus will be omitted.

Figure 3:
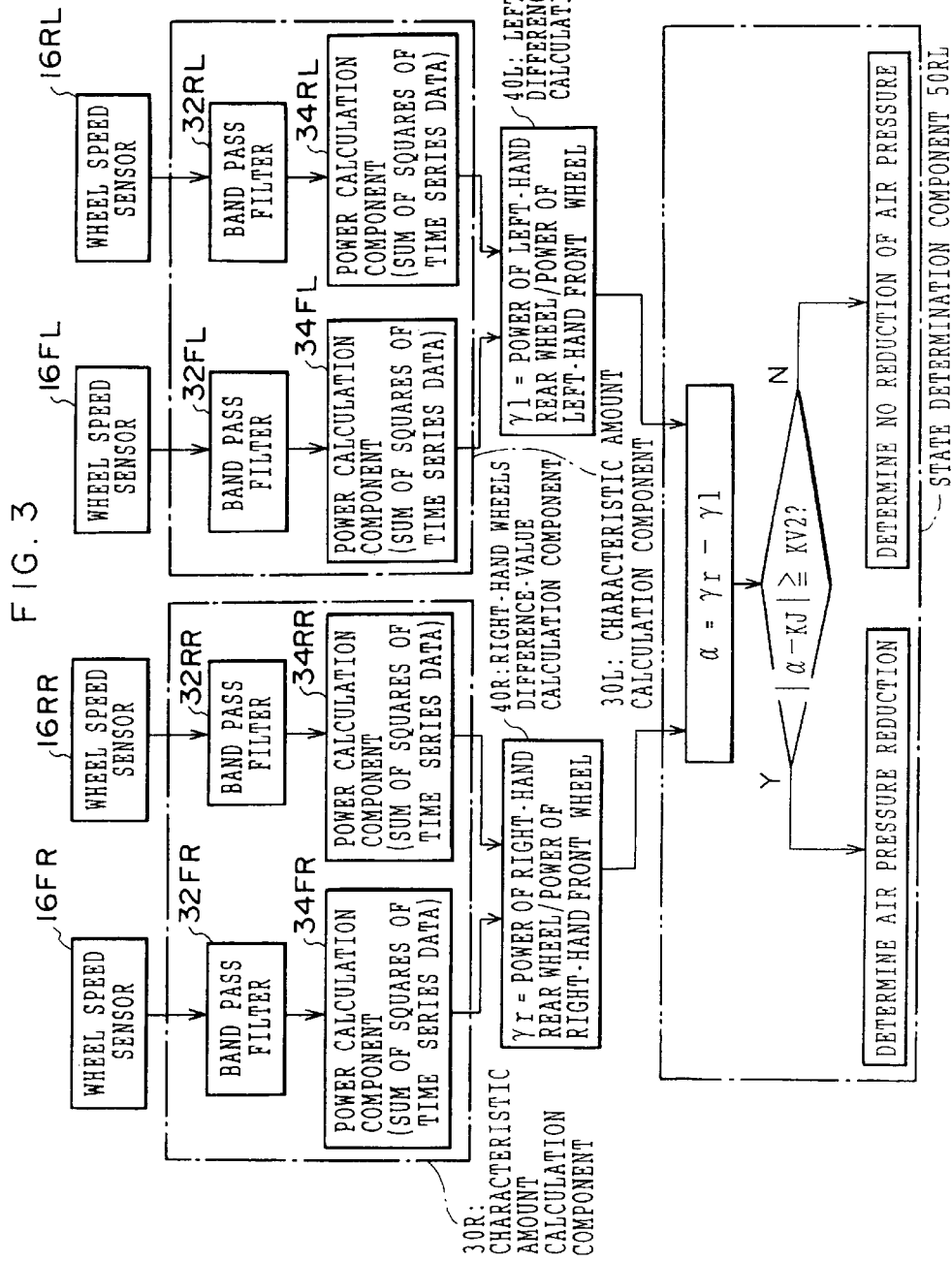
FIG. 3 is a flow diagram showing a flow of processing for estimating tire air pressure which is executed by an apparatus for estimating tire air pressure according to a second embodiment of the present invention.

Next, operation of the apparatus 10 for estimating tire air pressure according to the second embodiment will be described with reference to FIG. 3. FIG. 3 is a flow diagram showing a flow of processing for estimating tire air pressure which is iteratively executed by the ECU 12 at every predetermined interval of time (in the present embodiment, one second).

First, in a characteristic amount calculation component 30R, wheel speed signals outputted from the wheel speed sensor 16FR and the wheel speed sensor 16RR are respectively transmitted through the band pass filter 32FR and the band pass filter 32RR which are each set so as to pass wheel speed signals in a predetermined frequency range (in the present embodiment, 60 to 100 Hz) of wheel speed motion. Thereafter, a sum of squares of time series data of the wheel speed signals of the right-hand front wheel 20FR and the right-hand rear wheel 20RR, which signals have been passed through the above-described band pass filter, is calculated by the power calculation component 34FR and the power calculation component 34RR and outputted as powers of the wheel speed signals of the right-hand front wheel 20FR and the right-hand rear wheel 20RR.

Concurrently with the processing by the characteristic amount calculation component 30R, in a characteristic amount calculation component 30L, wheel speed signals outputted from the wheel speed sensor 16FL and the wheel speed sensor 16RL are passed through the band pass filter 32FL and the band pass filter 32RL, respectively, which are each set so as to pass wheel speed signals in a predetermined frequency range (in the present embodiment, 60 to 100 Hz) of wheel speed motion. Thereafter, the sum of squares of time series data of the wheel speed signals of the right-hand front wheel 20FL and the right-hand rear wheel 20RL, which signals have been passed through the above-described band pass filters, is calculated by the power calculation component 34FL and the power calculation component 34RL and outputted as the powers of the respective wheel speed signals of the right-hand front wheel 20FL and the right-hand rear wheel 20RL.

Next, in a calculation component 40R for a value of difference between right-hand wheels, the value of difference $\gamma r$ between the right-hand wheels is calculated by the following equation (3) using the power of the wheel speed signal of the right-hand front wheel 20FR and the power of the wheel speed signal of the right-hand rear wheel 20RR, which powers are outputted from the characteristic amount calculation component 30R. Further, in a calculation component 40L for the value of difference between left-hand wheels, the value of difference $\gamma l$ between the left-hand wheels is calculated by the following equation (4) using the power of the wheel speed signal of the left-hand front wheel 20FL and the power of the wheel speed signal of the left-hand rear wheel 20RL, which powers are outputted from the characteristic amount calculation component 30L.

$\gamma r$=power of right-hand rear wheel/power of right-hand front wheel (3)

$\gamma l$=power of left-hand rear wheel/power of left-hand front wheel (4)

In a state determination component 50RL, a difference between the value of difference $\gamma r$ between the right-hand wheels and the value of difference $\gamma l$ between the left-hand wheels is calculated as a value of difference $\alpha$ between all wheels (corresponding to "value of difference between right-hand wheels and left-hand wheels" of the present invention), and it is determined whether an absolute value of the difference between the value of difference a between all wheels and a predetermined reference value KJ is a predetermined value KV2 or more. When the absolute value of the difference is the predetermined value KV2 or more (when this determination is affirmative), it is determined that the air pressure of a tire on one of the wheels has been reduced. As a result, a control signal for operating the warning device 14 is outputted and a warning that the air pressure of a tire is abnormal is given to a vehicle occupant. Thereafter, the processing for estimating tire air pressure ends. Further, when the absolute value of the difference is less than the predetermined value KV2 (when the determination is negative), it is determined that the air pressure of each of all the tires is normal. As a result, the processing for estimating tire air pressure ends without giving any warning.

The above-described reference value KJ may be a value previously obtained by experiments, computer simulations or the like, which value equals the above-described value of difference a between all wheels at a time when the air pressures of all tires have not been reduced.

The above-described reference value KV2 may be a value previously obtained by experiments, computer simulations or the like, which value can be set such that, when the absolute value of the difference between the value of difference a between all wheels and the above-described reference value KJ is the predetermined value or more, the air pressure of a tire has abnormally been reduced.

As described above in detail, in the apparatus 10 for estimating tire air pressure according to the second embodiment of the present invention, the wheel speed of each of the right-hand front wheel, right-hand rear wheel, left-hand front wheel and left-hand rear wheel is detected, the characteristic amounts of frequency characteristics of the detected wheel speed signals, that is, the powers in the predetermined frequency range are calculated, the value of difference between right-hand wheels, which represents a degree of difference between the characteristic amount of the right-hand front wheel and the characteristic amount of the right-hand rear wheel, and the value of difference between left-hand wheels, which represents a degree of difference between the characteristic amount of the left-hand front wheel and the characteristic amount of the left-hand rear wheel, are calculated, and further, based on the obtained respective values of differences between right-hand wheels and between left-hand wheels, the state of air pressure of a tire is determined. As a result, the state of air pressure of a tire can be estimated with high accuracy in the range of vehicle speeds from a low travel speed to a high travel speed.

In the apparatus 10 for estimating tire air pressure according to the second embodiment, the ratio between the characteristic amount of the right-hand front wheel and the characteristic amount of the right-hand rear wheel is calculated as the value of difference between the right-hand wheels according to the present invention, and the ratio between the characteristic amount of the left-hand front wheel and the characteristic amount of the left-hand rear wheel is calculated as the value of difference between the left-hand wheels according to the present invention. Accordingly, the above-described value of difference between the right-hand wheels and value of difference between the left-hand wheels can be calculated simply and in a short time.

Further, in the apparatus 10 for estimating tire air pressure according to the second embodiment, the difference between the value of difference between the right-hand wheels and the value of difference between the left-hand wheels is calculated by the state determination component 50RL as the value of difference a between all wheels. When the degree of the difference between the value of difference a between all wheels, and the predetermined reference value KJ is the predetermined value KV2 or more, it is determined that the air pressure of a tire has been reduced. Accordingly, the above determination can be made simply and in a short time.

Moreover, in the apparatus 10 for estimating tire air pressure according to the second embodiment, the amount related to power in a predetermined frequency range of wheel speed is used as the characteristic amount of frequency characteristics of the wheel speed. Accordingly, the above-described characteristic amount can be derived simply and in a short time.

In the second embodiment of the present invention, there was described a case in which the power ratio between the wheel speed signals of the right-hand front wheel 20FR and the right-hand rear wheel 20RR and the power ratio between the wheel speed signals of the left-hand front wheel 20FL and the left-hand rear wheel 20RL are used as the value of difference between the right-hand wheels and the value of difference between the left-hand wheels of the present invention, respectively. However, the present invention is not limited to the same. For example, an absolute value $\gamma r'$ of the power difference between the wheel speed signals of the right-hand front wheel 20FR and the right-hand rear wheel 20RR, and an absolute value $\gamma 1'$ of the power difference between the wheel speed signals of the left-hand front wheel 20FL and the left-hand rear wheel 20RL, which absolute values are given by the following equations (5) and (6), can be used as the value of difference between the right-hand wheels and the value of difference between the left-hand wheels, respectively.

$$\gamma r' = |(\text{power of right-hand rear wheel}) - (\text{power of right-hand front wheel})| \quad (5)$$

$$\gamma 1' = |(\text{power of left-hand rear wheel}) - (\text{power of left-hand front wheel})| \quad (6)$$

In this case as well, the same effects as in the second embodiment can be obtained.

Further, in the second embodiment of the present invention, there was described a case in which the difference between the value of difference $\gamma r$ between the right-hand wheels and the value of difference $\gamma 1$ between the left-hand wheels is used as the value of difference $\alpha$ between all wheels. However, the present invention is not limited to the same. For example, a ratio $\alpha'$ between the value of difference $\gamma r$ between the right-hand wheels and the value of difference $\gamma 1$ between the left-hand wheels, which is given by the following equation (7), can be used as the value of difference between all wheels.

$$\alpha' = \text{value of difference } \gamma r \text{ between right-hand wheels/value of difference } \gamma 1 \text{ between left-hand wheels} \quad (7)$$

Moreover, in the second embodiment of the present invention, there was described a case in which it is determined whether the air pressure is abnormal based on a determination as to whether the degree of difference between the value of difference a of all wheels and the reference value KJ is the predetermined value KV2 or more. However, the present invention is not limited to the same. For example, the state of air pressure of a tire can be estimated based on a determination as to whether the value of difference $\alpha$ between all wheels is a predetermined value KV3 or more. The above-described predetermined value KV3 may be a value previously obtained by experiments, computer simulations or the like, which value can be set such that when the value of difference a between all wheels becomes the predetermined value or more, the air pressure of a tire is determined to have abnormally been reduced.

In each of the above-described embodiments, there was described a case in which a power of the wheel speed signal of each wheel, used as the characteristic amount of the present invention, is derived as a sum of squares of time series data of a wheel speed signal passed through a corresponding band pass filter. However, the present invention is not limited to the same. For example, the characteristic amount can also be derived as a power amplitude of a predetermined frequency by using a technique similar to fast Fourier transformation (FFT) or wavelet transformation. In this case as well, the same effects as those of the above-described embodiments can be obtained.

Further, in each of the above-described embodiments, there was described a case in which a wheel speed signal in a predetermined frequency range is extracted by the band pass filter. However, the present invention is not limited to the same. A high pass filter can also be used in place of the band pass filter. In this case as well, the same effects as those of the above-described embodiments can be obtained.

Moreover, in each of the above-described embodiments, there was described a case in which a frequency range in which a wheel speed signal is transmitted by the band pass filter, that is, a frequency range over which the power of the wheel speed signal is derived, is 60 to 100 Hz. However, the present invention is not limited to the same. For example, so long as the frequency range is set such that a power difference between the wheel speed signals of the right-hand front and rear wheels of a vehicle is caused by a reduction in air pressure of one of corresponding tires and a power difference between the wheel speed signals of the left-hand front and rear wheels of the vehicle is caused by a reduction in air pressure of one of corresponding tires, any frequency range can be applied.

[Experimental Results]

Figure 4:
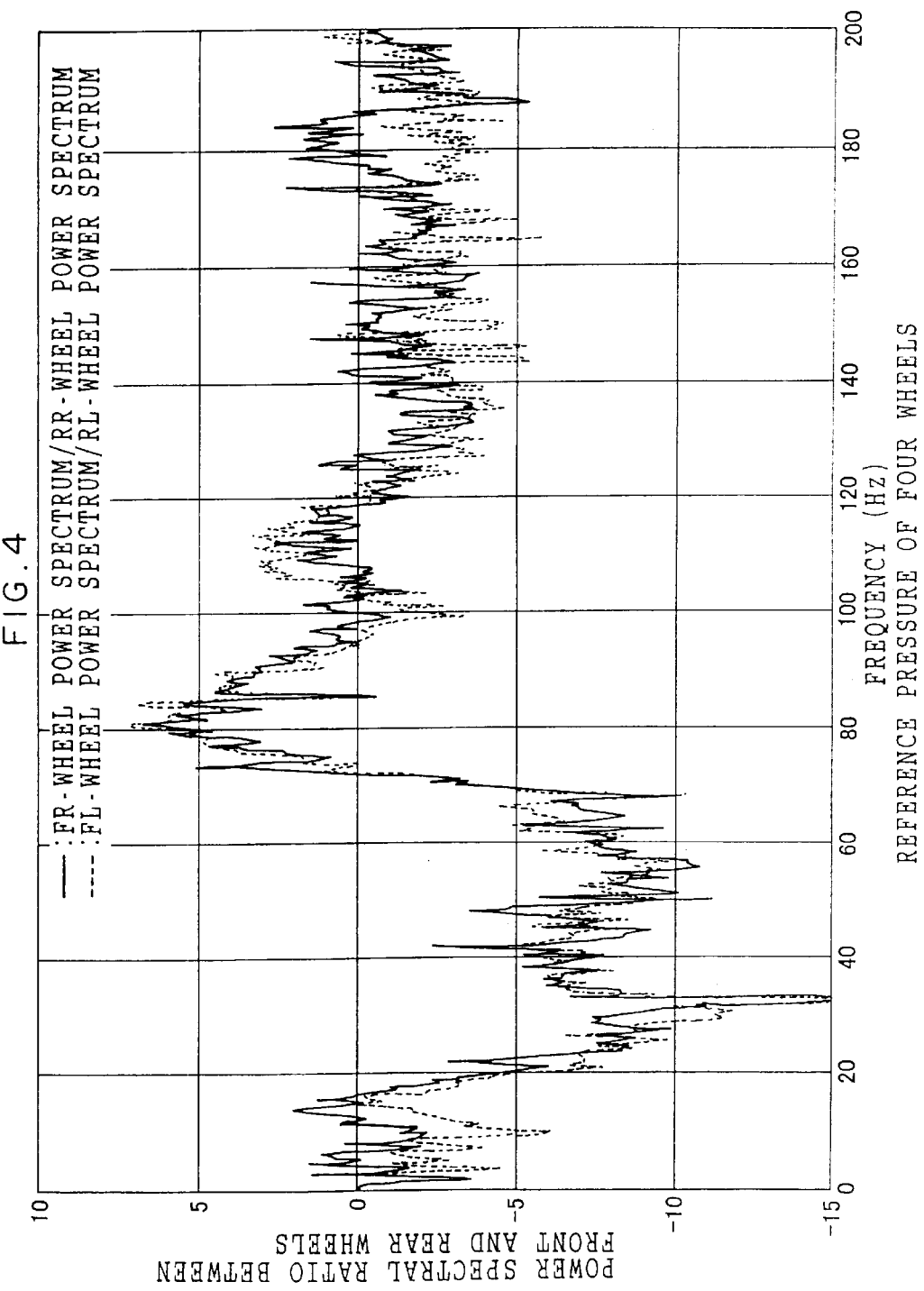
FIG. 4 is a graph showing results of actual measurement of a power spectral ratio between front and rear wheels at a right side of a vehicle and a power spectral ratio between front and rear wheels at a left side of the vehicle, when air pressure is set to a predetermined reference pressure in each of tires on all the wheels of the vehicle.

Next, a description will be given of results of experiments relating to the present invention, which were conducted by the present inventors. FIG. 4 shows the results of actual measurement of a power spectral ratio of right-hand wheels (represented by the solid line) obtained by dividing a power spectrum of a right-hand front wheel by a power spectrum of a right-hand rear wheel, and a power spectral ratio of left-hand wheels (represented by the broken line) obtained by dividing a power spectrum of a left-hand front wheel by a power spectrum of a left-hand rear wheel, when the air pressure of each of tires on all wheels (that is, the right-hand front wheel, right-hand rear wheel, left-hand front wheel and left-hand rear wheel) was set to a predetermined reference pressure.

As shown in FIG. 4, in this case, the power spectral ratio of the right-hand wheels and the power spectral ratio of the left-hand wheels exhibit substantially the same behaviors in the overall frequency range shown in this figure.

Figure 5:
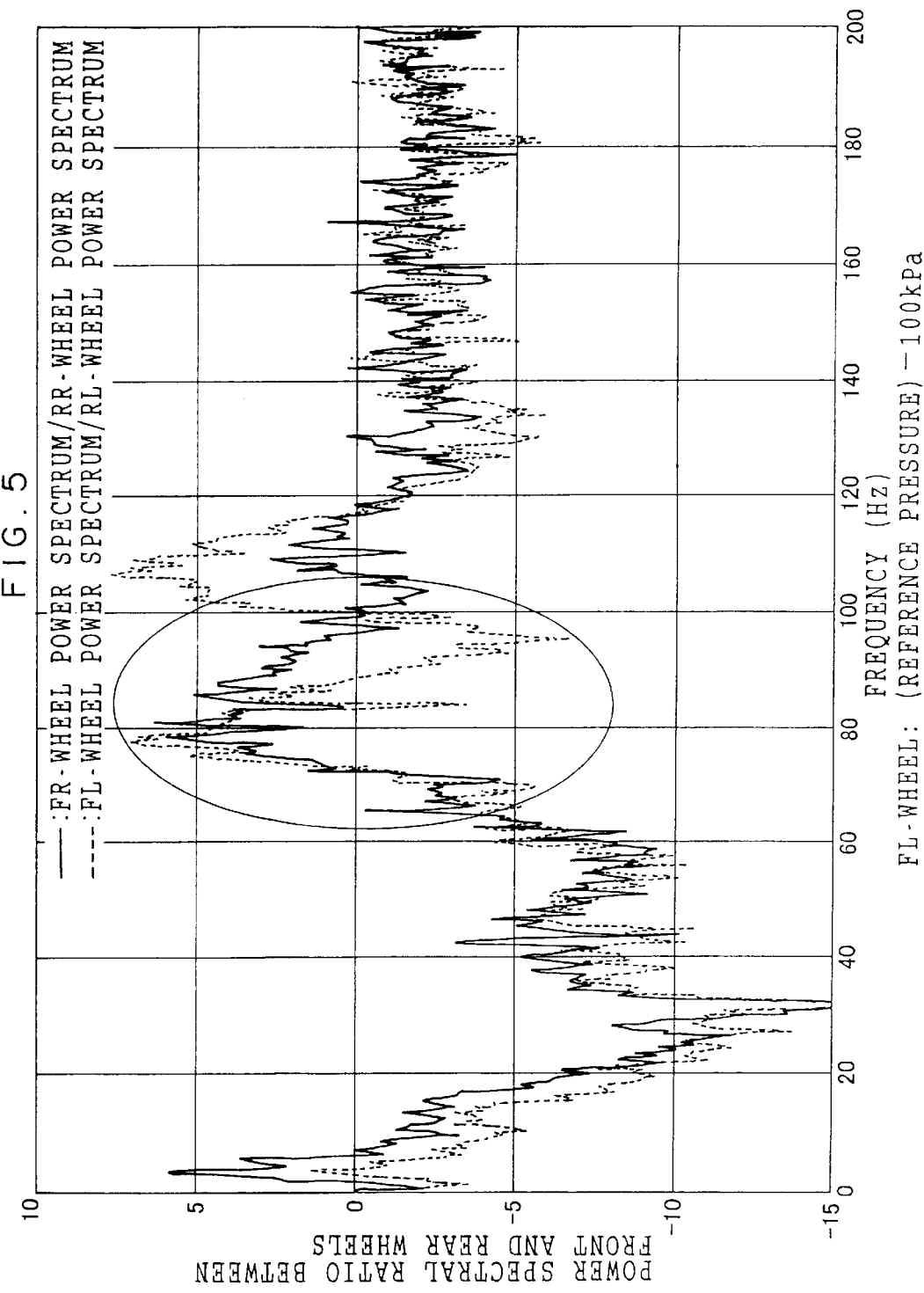
FIG. 5 is a graph showing results of actual measurement of the power spectral ratio between front and rear wheels at the right side of the vehicle and the power spectral ratio between front and rear wheels at the left side of the vehicle when only the air pressure of a tire on a left-hand front wheel is reduced by 100 (kPa) as compared with the other tires.

FIG. 5 shows the results of actual measurement of the power spectral ratio of the right-hand wheels (represented by the solid line) and the power spectral ratio of the left-hand wheels (represented by the broken line) when only the air pressure of a tire on the left-hand front wheel was reduced by 100 kPa as compared with other tires. Further, FIG. 6 shows the result of actual measurement of the power spectral ratio of the right-hand wheels (represented by the solid line) and the power spectral ratio of the left-hand wheels (represented by the broken line) when only the air pressure of a tire on the left-hand rear wheel was reduced by 100 kPa as compared with other tires.

Figure 6:
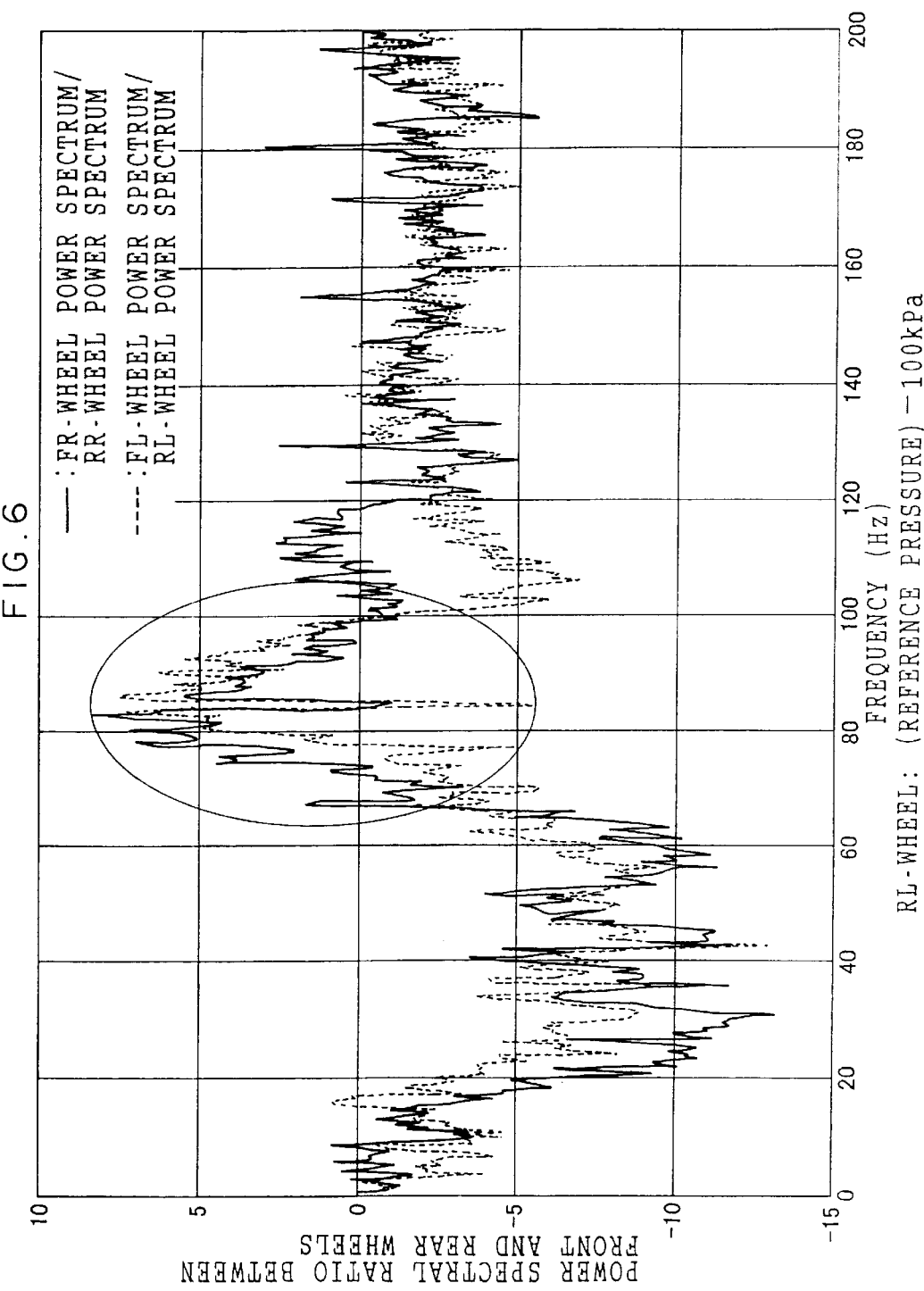
FIG. 6 is a graph showing results of actual measurement of the power spectral ratio between front and rear wheels at the right side of the vehicle and the power spectral ratio between front and rear wheels at the left side of the vehicle when only the air pressure of a tire on a left-hand rear wheel is reduced by 100 (kPa) as compared with the other tires.

As shown in FIGS. 4 to 6, it can be seen that, as compared with the power spectral ratio in the case of no reduction in air pressure (represented by the broken line in FIG. 4), the power spectral ratios when the air pressure of one of the front wheel and the rear wheel was reduced (represented by the broken lines in FIGS. 5 and 6) were each greatly different in a frequency range (approximately 60 to 100 Hz) which is twice a frequency range that includes an unsprung resonance frequency in the vertical direction of a vehicle (approximately 30 to 50 Hz), that is, in a frequency range including a second-order resonance frequency of an unsprung resonance frequency in the vertical direction of the vehicle.

Accordingly, due to the processing for estimating tire air pressure according to the above-described first embodiment, it is possible to reliably estimate reduction in the air pressure of one of tires on front and rear wheels.

Figure 7:
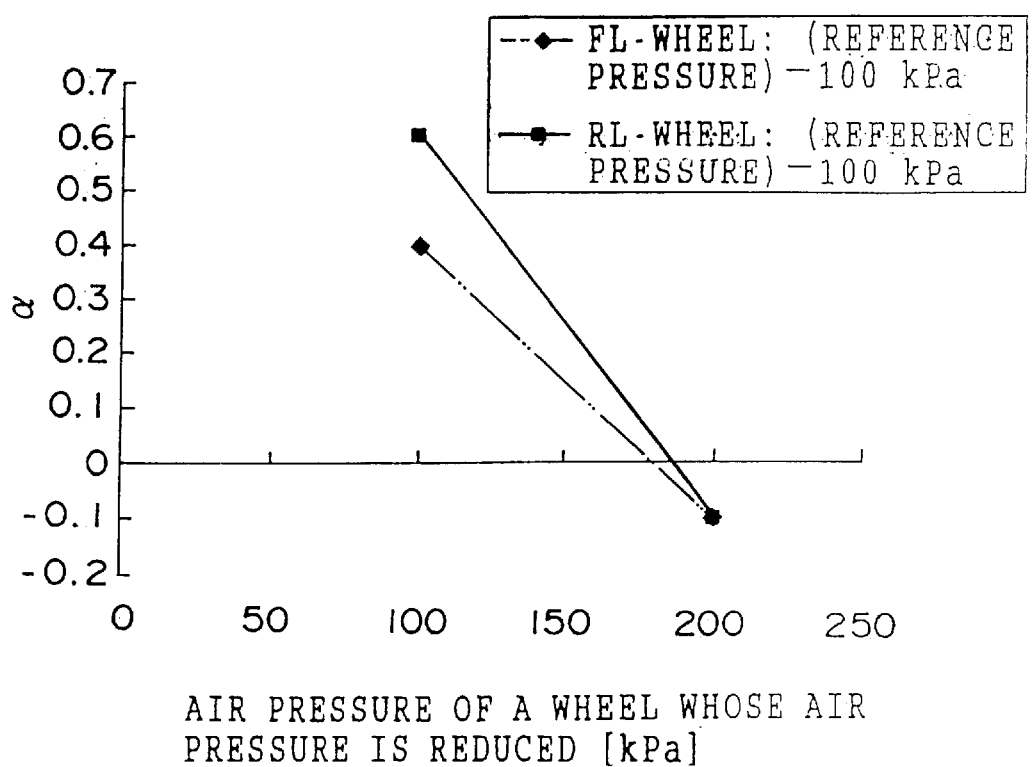
FIG. 7 is a graph showing example results of calculation of a value of difference between all wheels in the second embodiment of the present invention when the air pressure is set to a reference pressure in each of tires on all wheels, a value of difference between all wheels when only a tire on a left-hand front wheel is reduced, and a value of difference between all wheels when only a tire on a left-hand rear wheel is reduced.

FIG. 7 shows result of calculation of the value of difference a between all wheels in the second embodiment when the air pressure of each of tires on all wheels of a vehicle is set to a predetermined reference pressure, that is, 200 kPa, and also shows examples of the value of difference α between all wheels when only the air pressure of a tire on the left-hand front wheel is reduced by 100 kPa, and the value of difference a between all wheels when only the air pressure of a tire on the left-hand rear wheel is reduced by 100 kPa.

As shown in FIG. 7, the value of difference a between all wheels when the air pressure of each of tires on all wheels is the reference pressure was about −0.1. On the other hand, when the air pressure of the tire on the left-hand front wheel is reduced, the value of difference a between all wheels was about 0.4, and when the air pressure of the tire on the left-hand rear wheel is reduced, the value of difference a between all wheels was about 0.6.

Accordingly, in this case, due to the predetermined value KV2 in the above-described second embodiment being set at 0.1 or thereabouts, it is possible to reliably estimate if the air pressure of one of tires has been reduced.

According to the apparatus for estimating tire air pressure according to the first embodiment of the present invention, the wheel speed of each of front and rear wheels is detected, the characteristic amount of a frequency characteristic of each of the detected wheel speeds is calculated, the value of difference which represents a degree of a difference between the calculated characteristic amount of the front wheel and the calculated characteristic amount of the rear wheel are calculated, and, based on the calculated value of difference, a state of air pressure of a tire is determined. Accordingly, it is possible to estimate the state of air pressure of a tire with high accuracy in a range of vehicle speeds from a low travel speed to a high travel speed.

Further, according to the apparatus for estimating tire air pressure according to the second embodiment of the present invention, the wheel speed of each of a right-hand front wheel, right-hand rear wheel, left-hand front wheel and left-hand rear wheel is detected, the characteristic amount of a frequency characteristic of each of the detected wheel speeds is calculated, the value of difference between the right-hand wheels, which represents a degree of difference between the characteristic amounts of the right-hand front and rear wheels, and the value of difference between the left-hand wheels, which represents the degree of difference between the characteristic amounts of the left-hand front and rear wheels are calculated, and, based on the calculated value of difference between the right-hand wheels and value of difference between the left-hand wheels, a state of air pressure of a tire is determined. Accordingly, it is possible to estimate the state of air pressure of a tire with high accuracy in a range of vehicle speeds from a low travel speed to a high travel speed.

What is claimed is:

1. An apparatus for estimating tire air pressure comprising:
   a wheel speed detection component for detecting wheel speed of each of a front wheel and a rear wheel;
   a characteristic amount calculation component for calculating a characteristic amount of a frequency characteristic of each of the wheel speeds detected by said wheel speed detection component;
   a difference-value calculation component for calculating a value of difference which represents a degree of difference between a characteristic amount of the front wheel and a characteristic amount of the rear wheel, which characteristic amounts are calculated by said characteristic amount calculation component; and
   a state determination component for determining a state of air pressure of a tire based on the value of difference calculated by said difference-value calculation component.

2. The apparatus for estimating tire air pressure according to claim 1, wherein said difference-value calculation component calculates, as the value of difference, one of a difference and a ratio between the characteristic amount of the front wheel and the characteristic amount of the rear wheel.

3. The apparatus for estimating tire air pressure according to claim 1, wherein when the degree of difference between the characteristic amount of the front wheel and the characteristic amount of the rear wheel represented by the value of difference is at least a predetermined value, said state determination component determines that the air pressure of a tire has been reduced.

4. The apparatus for estimating tire air pressure according to claim 1, wherein when a degree of difference between the value of difference and a predetermined reference value is at least a predetermined value, said state determination component determines that the air pressure of a tire has been reduced.

5. The apparatus for estimating tire air pressure according to claim 1, wherein the characteristic amount of the frequency characteristic of the wheel speed is an amount related to power in a predetermined frequency range of the wheel speed.

6. An apparatus for estimating tire air pressure comprising:
- a wheel speed detection component for detecting wheel speed of each of a right-hand front wheel, a right-hand rear wheel, a left-hand front wheel and a left-hand rear wheel;
- a characteristic amount calculation component for calculating a characteristic amount of a frequency characteristic of each of the wheel speeds detected by said wheel speed detection component;
- a right-hand wheels difference-value calculation component for calculating a value of difference between right-hand wheels, which represents a degree of difference between a characteristic amount of the right-hand front wheel and a characteristic amount of the right-hand rear wheel, which characteristic amounts are calculated by said characteristic amount calculation component;
- a left-hand wheels difference-value calculation component for calculating a value of difference between left-hand wheels, which represents a degree of difference between a characteristic amount of the left-hand front wheel and a characteristic amount of the left-hand rear wheel, the characteristic amounts being calculated by said characteristic amount calculation component; and
- a state determination component for determining a state of air pressure of a tire based on the value of difference between right-hand wheels and the value of difference between left-hand wheels.

7. The apparatus for estimating tire air pressure according to claim 6, wherein said right-hand wheels difference-value calculation component calculates, as the value of difference between right-hand wheels, one of a difference and a ratio between the characteristic amount of the right-hand front wheel and the characteristic amount of the right-hand rear wheel, and
said left-hand wheels difference-value calculation component calculates, as the value of difference between left-hand wheels, one of a difference and a ratio between the characteristic amount of the left-hand front wheel and the characteristic amount of the left-hand rear wheel.

8. The apparatus for estimating tire air pressure according to claim 6, wherein said state determination component calculates, as a value of difference between right and left, one of a difference and a ratio between the value of difference between right-hand wheels and the value of difference between left-hand wheels, and, when a degree of difference between the value of difference between right-hand wheels, and the value of difference between left-hand wheels represented by the value of difference between right and left, is at least a predetermined value, said state determination component determines that the air pressure of a tire has been reduced.

9. The apparatus for estimating tire air pressure according to claim 6, wherein said state determination component calculates, as a value of difference between right and left, one of a difference and a ratio between the value of difference between right-hand wheels and the value of difference between left-hand wheels, and, when a degree of difference between the value of difference between right and left, and a predetermined reference value is at least a predetermined value, said state determination component determines that the air pressure of a tire has been reduced.

10. The apparatus for estimating tire air pressure according to claim 6, wherein the characteristic amount of the frequency characteristic of the wheel speed is an amount related to power in a predetermined frequency range of the wheel speed.

11. A method for estimating tire air pressure, comprising the steps of:
- (a) detecting wheel speed of each of a front wheel and a rear wheel;
- (b) calculating a characteristic amount of a frequency characteristic of each of the wheel speeds detected in said step (a);
- (c) calculating a value of difference which represents a degree of difference between a characteristic amount of the front wheel and a characteristic amount of the rear wheel, which characteristic amounts are calculated in said step (b); and
- (d) determining a state of air pressure of a tire based on the value of difference calculated in said step (c).

12. The method for estimating tire air pressure according to claim 11, wherein said step (c) comprises calculating, as the value of difference, one of a difference and a ratio between the characteristic amount of the front wheel and the characteristic amount of the rear wheel.

13. The method for estimating tire air pressure according to claim 11, wherein said step (d) comprises determining, when the degree of difference between the characteristic amount of the front wheel and the characteristic amount of the rear wheel represented by the value of difference is at least a predetermined value, that the air pressure of a tire has been reduced.

14. The method for estimating tire air pressure according to claim 11, wherein said step (d) comprises determining, when a degree of difference between the value of difference and a predetermined reference value is at least a predetermined value, that the air pressure of a tire has been reduced.

15. The method for estimating tire air pressure according to claim 11, wherein the characteristic amount of the frequency characteristic of the wheel speed is an amount related to power in a predetermined frequency range of the wheel speed.

16. A method for estimating tire air pressure, comprising the steps of:
- (a) detecting wheel speed of each of a right-hand front wheel, a right-hand rear wheel, a left-hand front wheel and a left-hand rear wheel;
- (b) calculating a characteristic amount of a frequency characteristic of each of the wheel speeds detected in said step (a);
- (c) calculating a value of difference between right-hand wheels, which represents a degree of difference between a characteristic amount of the right-hand front wheel and a characteristic amount of the right-hand rear wheel, which characteristic amounts are calculated in said step (b);
- (d) calculating a value of difference between left-hand wheels, which represents a degree of difference between the characteristic amount of the left-hand front wheel and the characteristic amount of the left-hand rear wheel, which characteristic amounts are calculated in said step (b); and
- (e) determining a state of air pressure of a tire based on the value of difference between right-hand wheels and the value of difference between left-hand wheels.

17. The method for estimating tire air pressure according to claim 16, wherein said step (c) comprises calculating, as the value of difference between right-hand wheels, one of a difference and a ratio between the characteristic amount of the right-hand front wheel and the characteristic amount of the right-hand rear wheel, and said step (d) comprises calculating, as the value of difference between left-hand wheels, one of a difference and a ratio between the characteristic amount of the left-hand front wheel and the characteristic amount of the left-hand rear wheel.

18. The method for estimating tire air pressure according to claim 16, wherein said step (e) comprises calculating, as a value of difference between right and left, one of a difference and a ratio between the value of difference between right-hand wheels and the value of difference between left-hand wheels, and determining, when a degree of difference between the value of difference between the right-hand wheels and the value of difference between the left-hand wheels, represented by the value of difference between right and left is at least a predetermined value, that the air pressure of a tire has been reduced.

19. The method for estimating tire air pressure according to claim 16, wherein said step (e) comprises calculating, as a value of difference between right and left, one of a difference and a ratio between the value of difference between right-hand wheels, and the value of difference between left-hand wheels, and determining, when a degree of difference between the value of difference between right and left and a predetermined reference value is at least a predetermined value, that the air pressure of a tire has been reduced.

20. The method for estimating tire air pressure according to claim 16, wherein the characteristic amount of the frequency characteristic of the wheel speed is an amount related to power in a predetermined frequency range of the wheel speed.

* * * * *

UNITED STATES PATENT AND TRADEMARK OFFICE
CERTIFICATE OF CORRECTION

PATENT NO. : 6,584,427 B2
DATED : June 24, 2003
INVENTOR(S) : Kazuhiro Kamiya et al.

It is certified that error appears in the above-identified patent and that said Letters Patent is hereby corrected as shown below:

<u>Title page,</u>
Item [56], References Cited, please add the following:

-- [56]	FOREIGN PATENT DOCUMENTS

JP    2836652    10/98
        JP    9-002031   01/97 --

Signed and Sealed this

Eighteenth Day of May, 2004

JON W. DUDAS
*Acting Director of the United States Patent and Trademark Office*